Sept. 29, 1931.    M. CHAMBON    1,825,442
DRIVING DEVICE EMPLOYING MALTESE CROSS WHEELS
Filed April 8, 1929
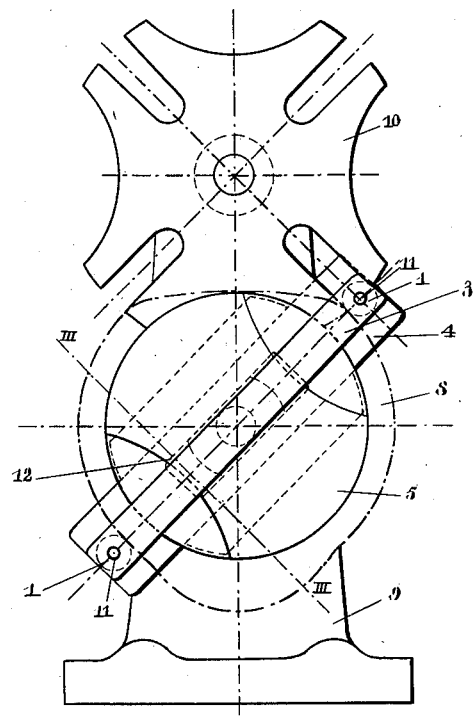
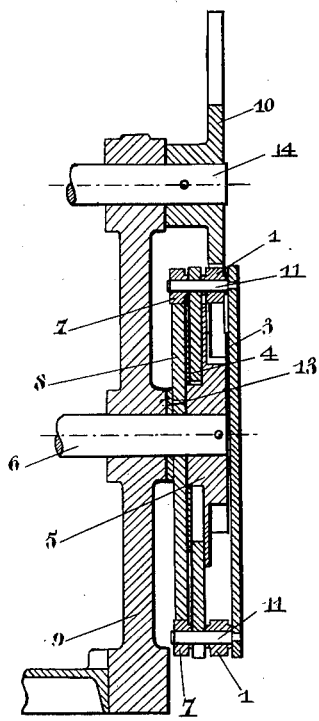
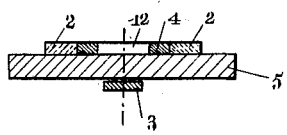
Inventor:
M. Chambon Patented Sept. 29, 1931

1,825,442

UNITED STATES PATENT OFFICE

MARIUS CHAMBON, OF PARIS, FRANCE, ASSIGNOR TO ETABLISSEMENTS L. CHAMBON, OF PARIS, FRANCE

DRIVING DEVICE EMPLOYING MALTESE CROSS WHEELS

Application filed April 8, 1929, Serial No. 353,505, and in France April 19, 1928.

Improvements in driving devices employing Maltese cross wheels.

In driving devices in which Maltese cross wheels are employed, the angular accelerations attain great values which make it necessary to limit the speed of rotation. In particular, in the case in which the actuated parts have a certain inertia, for instance in machine tools, the driving gear is rapidly worn out, and the rollers become jammed in the slots.

All such drawbacks are obviated by the present invention, by giving to the rollers which enter the slots of the cross wheel and thus drive the latter, no longer a uniform circular motion as before, but a variable motion, such that the maximum accelerations of the cross wheel are reduced. By the use of adequate means, the shaft driving the rollers can be given a circular motion such that the motion of the Maltese cross wheel will vary according to a sinusoid.

This result may even be more simply obtained, by varying the distance between the rollers and their axis of rotation according to a periodic law whose period is determined by the number of slots in the said cross wheel. In a preferred device, I place parallel to the roller-carrying disk, a stationary cam upon which are caused to roll suitable auxiliary rollers effecting the radial displacement of the said main rollers, which latter are mounted for instance on a cross piece movable in a guide formed in the driving disk. The said cam is preferably so arranged that when the Maltese cross wheel rotates, its motion comes near a sinusoid.

The said cam may however be given any other form, so as to provide a motion particularly adapted to the work to be performed. Obviously, without departing from the spirit of the invention, in the motion thus obtained, the accelerations of the Maltese cross wheel may exceed those which would be obtained without the cam.

The following description relates to an embodiment of the invention.

In the accompanying drawings which are given by way of example:

Figure 1 is an elevational view of the apparatus according to the invention. Figure 2 is a section of said apparatus on a vertical plane passing through the axes of rotation of the Maltese cross wheel and of the disk, in the position for which the two slots of the cross wheel are vertical. Figure 3 is a partial section of the disk and of the cross piece supporting the rollers, on the line III—III of Figure 1.

The device herein represented comprises a frame 9 on which are mounted the driving shaft 6 and the actuated shaft 14. To the shaft 6 is keyed a disk 5 which drives the two rollers 1 by means of a device to be further described. The said rollers 1, or main rollers, assure, in the usual manner, the movement of the Maltese cross wheel 10 by successively entering the four slots of the latter. The rollers 1 are mounted on the ends of a cross piece 4 which is slidable on the rear side of the said disk 5. For this purpose, the cross piece 4 carries at its centre a groove 12 into which is inserted the end of the shaft 6. The rollers 1 are mounted respectively upon the axles 11 serving as cross braces between the rear cross piece 4 and the cross piece 3 which is parallel to the same and is disposed on the front side of the disk 5.

The cross piece 4 is slidable between guides 2 secured to the disk 5 in such manner as to be drawn forward with the same. At the rear of the disk 5, the cam 8 having a suitable outline is secured to the frame 9 by pins such as 13. The axles 11 carry rollers 7 adapted to roll upon the said cam 8.

It is observed in Figure 1 that during the rotation of the disk 5, the rollers 7 will roll upon the cam 8, thus moving the cross piece 4 in its guides, in such manner that the main rollers 1 are actuated at the same time by a radial displacement which is superposed on their rotation about the driving shaft 6.

The form of the cam 8 in the present example is such that the movement of the Maltese cross wheel, when it rotates, comes near a sinusoid. The distance between the rollers 1 and their axis of rotation 6 becomes less at the time at which, in the usual Maltese cross wheel, the acceleration is at the maximum value, so that this acceleration will be less, with this form of the cam 8. This apparatus can be employed to advantage to obtain a predetermined acceleration, and even, if the speed permits, with a law of the movement of the rollers such that the maximum acceleration exceeds the value which it would attain in the usual Maltese cross wheel of corresponding construction.

Having now particularly described my invention and in what manner the same is to be performed, I claim as my invention:

1. Power transmitting device comprising a drive shaft, a driven shaft, a Geneva gear mounted on said driven shaft, a plate mounted on the drive shaft, a sliding member on said plate, a cam parallel with said plate, a roller mounted on said member and engaging with the cam, another roller mounted on said member, this latter roller engaging with the Geneva gear.

2. Power transmitting device comprising a drive shaft, a driven shaft, a Geneva gear mounted on said driven shaft, a plate mounted upon said drive shaft, a sliding member upon said plate, a roller mounted upon said sliding member and engaging said Geneva gear, and cam means for modifying the path of movement of said roller so as to diminish the distance between said roller and said drive shaft when the roller is engaged with said Geneva gear.

3. Power transmitting apparatus according to claim 11 in which the cam is of such formation that the movement of the Geneva gear is substantially sinusoidal.

In testimony whereof I have signed this specification.

MARIUS CHAMBON.